United States Patent [19]
Aoki et al.

[11] Patent Number: 5,232,418
[45] Date of Patent: Aug. 3, 1993

[54] HYDRAULIC ACTUATOR IN AUTOMATIC TRANSMISSION

[75] Inventors: Hideyuki Aoki; Kozo Kato, both of Anjo; Yoichi Hayakawa, Toyoake, all of Japan

[73] Assignee: Aisin AW Co., Ltd., Japan

[21] Appl. No.: 808,849

[22] Filed: Dec. 17, 1991

[30] Foreign Application Priority Data

Dec. 17, 1990 [JP] Japan .................. 2-411223

[51] Int. Cl.⁵ ........................... F16D 57/10
[52] U.S. Cl. .................. 475/271; 475/281; 475/283; 475/330; 192/85 AA; 192/48.8
[58] Field of Search .......... 192/85 AA, 48.8; 475/271, 281, 283, 330

[56] References Cited

U.S. PATENT DOCUMENTS

| | | | |
|---|---|---|---|
| 4,716,787 | 1/1988 | Miura et al. | 475/146 |
| 4,732,253 | 3/1988 | Hiramatsu et al. | 192/85 AA X |
| 4,971,185 | 11/1990 | Hayakawa et al. | 192/85 R |
| 5,029,685 | 7/1991 | Takase et al. | 192/85 AA X |

FOREIGN PATENT DOCUMENTS

| | | | |
|---|---|---|---|
| 63-96320 | 4/1988 | Japan | 192/85 AA |
| 1-206124 | 8/1989 | Japan | 192/85 AA |
| 2-113165 | 4/1990 | Japan | |

Primary Examiner—Allan D. Herrmann
Assistant Examiner—William O. Trousdell
Attorney, Agent, or Firm—Lorusso & Loud

[57] ABSTRACT

A double-acting hydraulic actuator structure for use in an automatic transmission has a two-layered structure which includes first and second frictional engagement element hydraulic actuators. The first hydraulic actuator includes a drum member and a first piston fitted hermetically and slidably in the drum member. The second hydraulic actuator is formed by the interior of the first piston and a second piston fitted hermetically and slidably mounted within the first piston. The first and second pistons are both urged toward their disengaged positions by the action of a common return spring. A second spring is provided for urging the second piston alone against the force of the return spring.

11 Claims, 6 Drawing Sheets

| | | C1 | C2 | B1 | B2 | B3 | F1 | F2 | C3 | B4 | F3 |
|---|---|---|---|---|---|---|---|---|---|---|---|
| | P | | | | | | | | | ○ | |
| | R | | ○ | | | ○ | | | | ○ | |
| | N | | | | | | | | | ○ | |
| D | 1 | ○ | | | | | | ○ | | ○ | ○ |
| D | 2 | ○ | | (○) | ○ | | ○ | | | ○ | ○ |
| D | 3 | ○ | | (○) | ○ | | ○ | | ○ | | |
| D | 4 | ○ | ○ | | ○ | | | | ○ | | |
| 3 | 1 | ○ | | | | | | ○ | | ○ | ○ |
| 3 | 2 | ○ | | | ○ | ○ | ○ | | | ○ | ○ |
| 3 | 3 | ○ | | | ○ | ○ | ○ | | ○ | | |
| 2 | 1 | ○ | | | | | | ○ | | ○ | ○ |
| 2 | 2 | ○ | | | ○ | ○ | ○ | | | ○ | ○ |
| 1 | 1 | ○ | | | | ○ | | ○ | | ○ | ○ |
| 1 | 2 | ○ | | | ○ | ○ | | ○ | | ○ | ○ |

Columns C1–F2: FIRST AUTOMATIC TRANSMISSION MECHANISM 26
Columns C3–F3: SECOND AUTOMATIC TRANSMISSION MECHANISM 27

FIG. 3

HYDRAULIC ACTUATOR IN AUTOMATIC TRANSMISSION

BACKGROUND OF THE INVENTION

1. Field of the Invention

The present invention relates to a hydraulic actuator for actuating frictional engagement elements such as clutches or brakes of an automatic transmission and, more particularly, to a two-layered (double piston) hydraulic actuator structure of the type in which a first piston is fitted in a drum member whereas a second piston is fitted concentrically in the first piston and in which a single return spring biases both the first and second pistons.

2. DESCRIPTION OF THE PRIOR ART

In recent years, we have devised an automatic transmission which is equipped with the above-described type of hydraulic actuator structure as disclosed, for example, in Japanese Patent Laid-Open No. 141343. As shown in FIG. 6, this automatic transmission has its rear end portion rotatably supporting a drum member 2 which is fixed to an input shaft 1. In the drum member 2 is a first piston 3 hermetically and slidably mounted therein through O-rings 5 and 5', with its leading end engaging a first clutch C1. A second piston 6, with its leading and engaging a second clutch C2, is hermetically and slidably mounted concentrically within the first piston 3 through O-rings 7 and 7'. A return spring 10 is mounted between the back of the second piston 6 and a retainer 9 which is fixed to the input shaft sleeve portion 1a. The return spring 10 urges both the first piston 3 and the second piston 6 to the left in the drawing. The interior of the drum member 2 and the first piston 3 together form a hydraulic actuator 11 for the first clutch C1, and the interior of the first piston 3 and the second piston 6 together form a hydraulic actuator 12 for the second clutch C2. These two hydraulic actuators 11 and 12 are radially superposed to form a two-layered (double piston) hydraulic actuator unit 15.

The following table gives the positions of the two pistons for various transmission operating ranges in an automobile.

TABLE 1

| Range | C1 | C2 | Stroke | F | A | Pc |
|---|---|---|---|---|---|---|
| R | x | o | $s_2$ | $Fs(s_2)$ | Small | High |
| N | x | o | | | | |
| D-1 | o | x | $s_1$ | $Fs(s_1)$ | Large | Low |
| D-4 | o | o | $s_1 + s_2$ | $Fs(s_1 + s_2)$ | Small | Max. |

Specifically, the first clutch C1 is engaged in the drive range D and released in the reverse range R and neutral range N, and the second clutch C2 is engaged in the R range and in the 4th speed of the D range and released in the remaining ranges. The first piston 3 applies a predetermined pushing force $Fs(s_1)$ to the first clutch C1, which is engaged at the 1st to 3rd speeds of the D range, against the force Fs of the return spring 10 corresponding a stroke $s_1$. The first piston 3 has a large external diameter $D_1$ and a relatively large pressure receiving area $A_1$ so that the oil pressure $Pc_1$ which acts upon the piston 3 is relatively low and is expressed by $Pc_1 = Fs(s_1)/A_1$. The second piston 6 applies a predetermined pushing force $Fs(s_2)$, which corresponds to a stroke s, substantially equal to that of the first piston 1, to the second clutch C2 which is engaged in the R range. The second piston 6 has a small external diameter $D_2$ which is substantially equal to the diameter of the internal portion of the first piston in which it slides, and has a relatively small pressure receiving area $A_2$ so that the oil pressure $Pc_2$ which acts upon the second piston 6 is relatively high and is expressed by the formula $Pc_2 = Fs(s_2)/A_2$. At the 4th speed of the D range, moreover, the second clutch C2 is engaged while the first clutch C1 is also engaged. As a result, the second piston 6 moves with a stroke of $(s_1 + s_2)$ so that the return spring 10 has a high spring load of $(Fs(s_1 + s_2))$. Since the piston 6 has the small pressure receiving area A, the oil pressure $Pc_2$ which acts upon the piston 6 in range D-4 is at its maximum.

The return spring 10 is designed to provide a force by which the first piston 3 is quickly returned against the sliding resistance of the O-rings 5 and 5' when the range is shifted from D to R (i.e., D→>R). In shifts of D→>N ranges at a high speed, the spring force Fs is relatively high so that the first piston 3 moves smoothly against the sliding resistance of the O-ring 5 which is subjected to centrifugal force, to thereby prevent establishment of a trailing torque.

Thus, the oil pressure $Pc_1$ to the hydraulic actuator 11 for the first clutch C1 can be held at a predetermined level to lighten the shift shocks in the shift of the N→>D ranges, but the oil pressure $Pc_2$ to the hydraulic actuator 12 for the second clutch C2 becomes too high for the accumulator to provide a sufficient cushioning function. As a result, high shift shocks may occur when the clutch C2 is engaged, i.e., in the shifting operations of N→>R ranges and 3rd speed→>4th speed.

The problems thus far described are encountered in an automatic transmission which has its second clutch C2 engaged in the reverse range and at the 4th speed and are also encountered in the automatic transmission which is disclosed in Japanese Patent Laid-Open No. 113165/1990, for example. In short, the problems are common to all double piston hydraulic actuator units having a shared return spring.

SUMMARY OF THE INVENTION

It is, therefore, an object of the present invention to provide a double piston hydraulic actuator structure for use in an automatic transmission, which enables reduced oil pressure to act upon the second piston, thereby to solve the aforementioned problems, by applying a predetermined spring force to the second piston against the urging force of the return spring.

According to the present invention, there is provided a double hydraulic actuator two-layered or two-tiered structure for use in an automatic transmission, which includes outer and inner hydraulic actuators for engaging, respectively, first and second frictional engagement elements. The outer hydraulic actuator includes a drum member and a first piston fitted hermetically and slidably in the drum member. The inner hydraulic actuator includes a second piston fitted hermetically and slidably in the first piston. The double hydraulic actuator structure further includes a return spring for urging the first piston and the second piston in a first direction and a second spring for urging the second piston against the urging force of the return spring, i.e. in a second direction opposite the first direction.

If the first frictional engagement element is to be engaged by the double actuator structure described above, a predetermined control oil pressure is fed to or discharged from the first hydraulic actuator. For engagement, the first piston is subjected to the control oil pressure and urged thereby against the urging force of the return spring. Because the first piston has a large pressure receiving area, an oil pressure as low as conventional is sufficient. In order to engage the second frictional engagement element, on the other hand, a second oil pressure is fed to or discharged from the second hydraulic actuator. For engagement, the second piston is urged by both (1) the second oil pressure and (2) the force of the second spring against the urging force of the return spring so that the second control oil pressure can be reduced by an extent corresponding to the urging force of the second spring. Thus, despite the small pressure receiving area of the second piston, the oil pressure which acts upon the inner hydraulic actuator can be set at a lower level.

BRIEF DESCRIPTION OF THE ACCOMPANYING DRAWINGS

Other objects and features of the present invention will become apparent from the following description to be made with reference to the accompanying drawings, in which:

FIG. 3 is an operational chart or table indicating operation of the various actuators of the automatic transmission in the various drive ranges;

Figure 5:
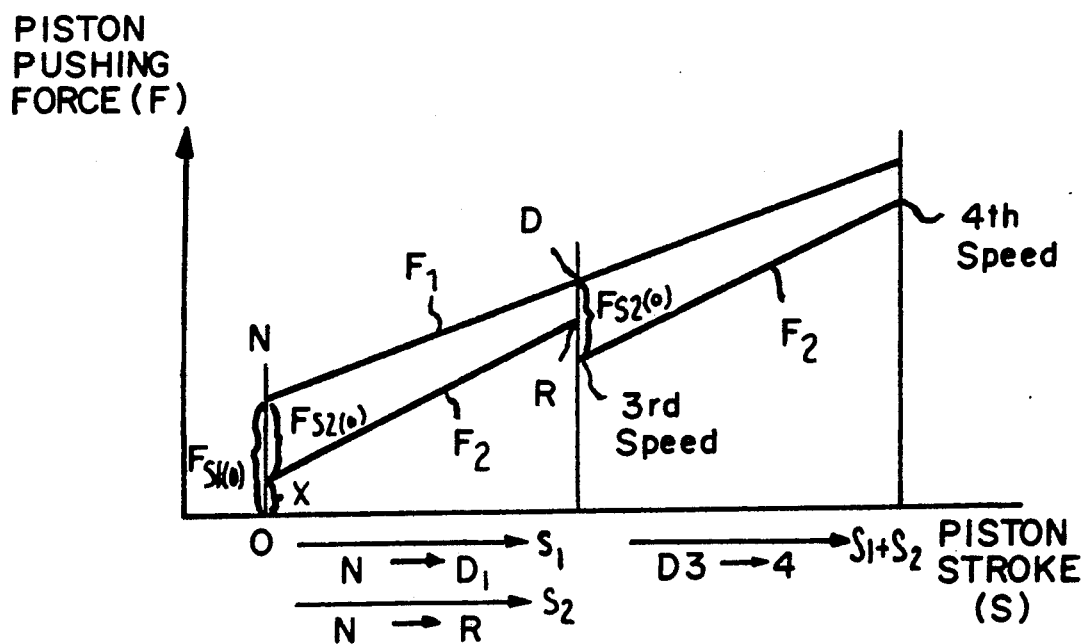
Figure 6:
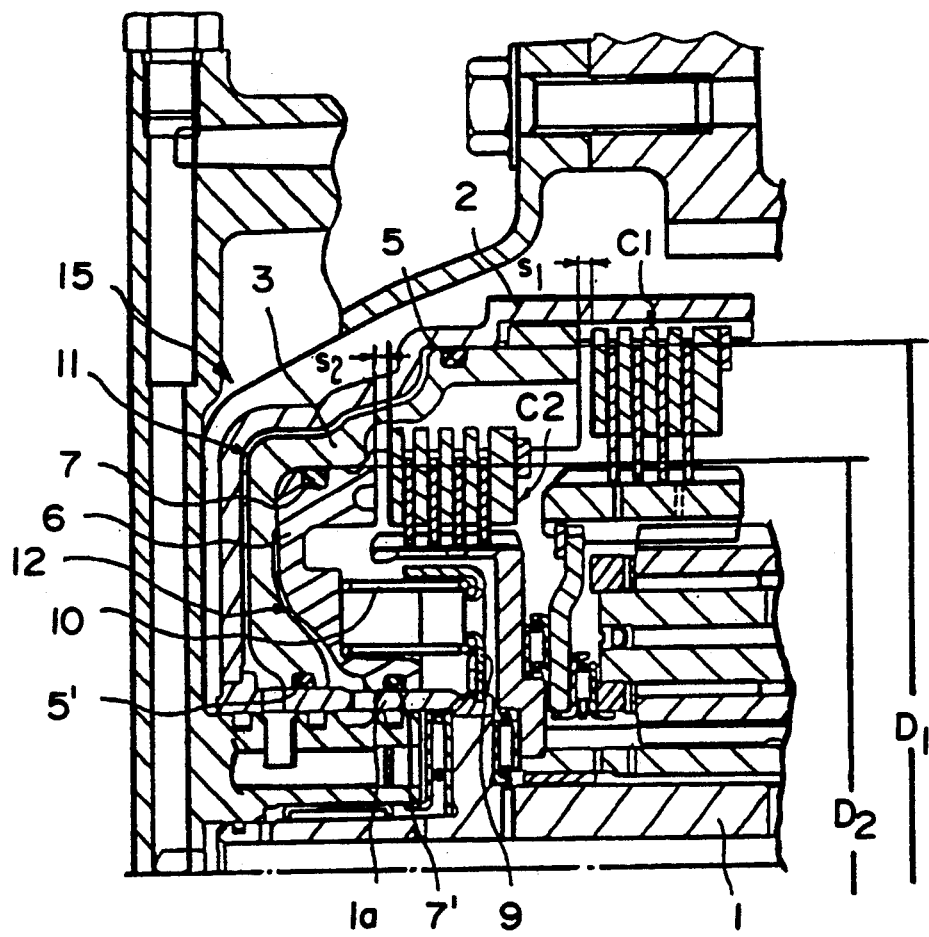

FIGS. 4(a), 4(b), 4(c) and 4(d) are schematic diagrams showing the hydraulic actuator structure in different states;

FIG. 5 is a graph showing the pushing forces of the individual pistons versus the distance of the individual strokes; and FIG. 6 is a partial view in cross-section of the hydraulic actuator structure of the prior art.

DESCRIPTION OF THE PREFERRED EMBODIMENTS

The present invention will be described in the following with reference to the accompanying drawings.

Figure 2:
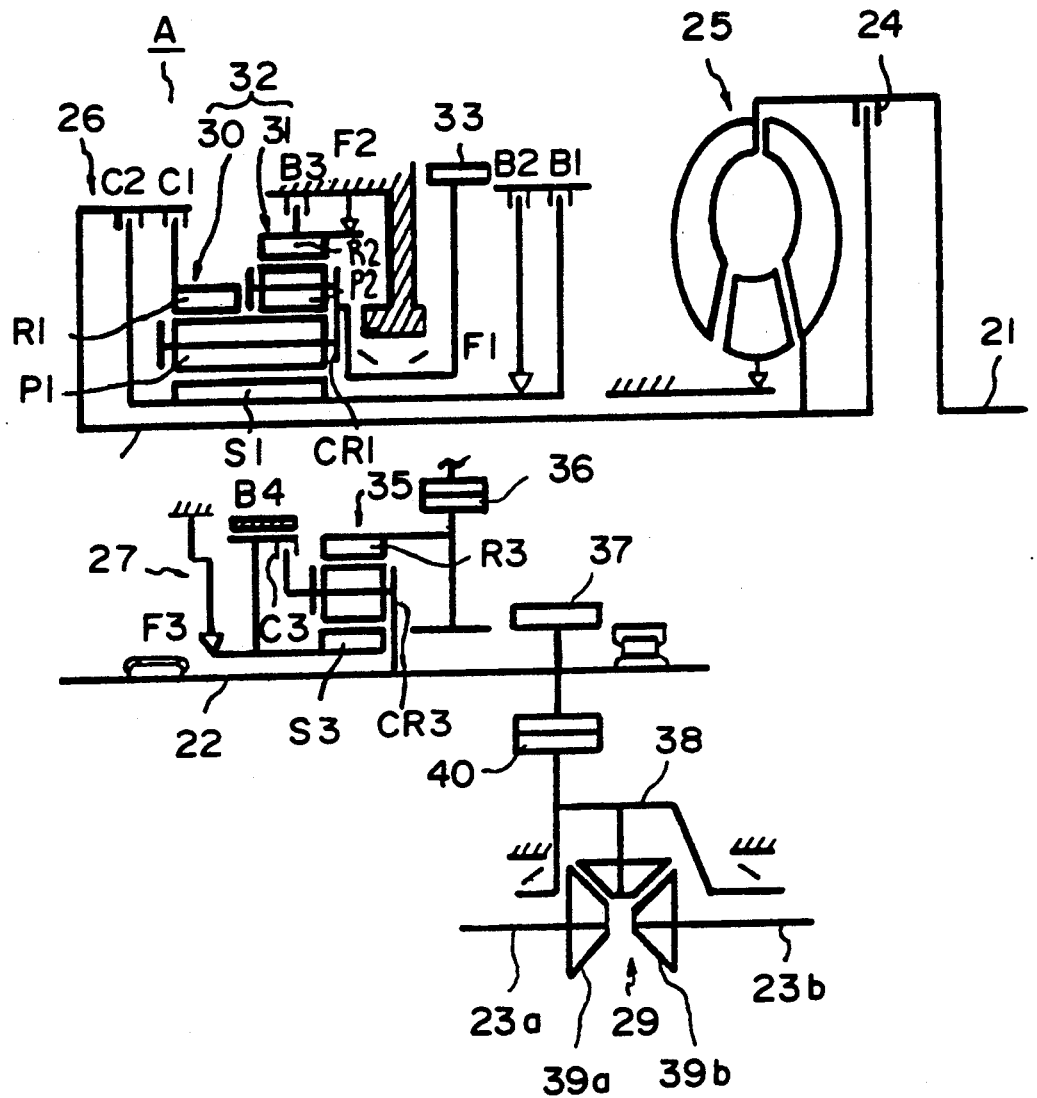
FIG. 2 is a schematic diagram showing the automatic transmission.

An automatic transmission A which utilizes the present invention will first be briefly described with reference to FIG. 2. The automatic transmission A has three shafts, i.e., an input shaft 1 aligned with an engine crankshaft 21, a counter shaft 22 and a front axle 23a and 23b. The input shaft 1 supports a torque converter 25 having a lockup clutch 24 and a first automatic transmission mechanism 26. The counter shaft 22 supports a second automatic transmission mechanism 27. Moreover, the front axle 23a and 23b supports a front differential unit 29.

The first automatic transmission mechanism 26 is equipped with a planetary gear unit 32 having a single planetary gear 30 and a dual planetary gear 31 in combination. In the planetary gear unit 32, the sun gear S1 and carrier CR1 of the aforementioned two planetary gears are connected to each other, and a long pinion P1 meshes with the sun gear S1. The input shaft 1 and a ring gear R1 (hereinafter "small ring gear") of the single planetary gear 30 are connected through a first (forward) clutch C1, and the input shaft 1 and the sun gear S1 are connected through a second (reverse/direct) clutch C2. Moreover, the sun gear S1 is directly restrained by a first brake B1 and is limited to rotation in one direction only through a first one-way clutch F1 by a second brake B2. Furthermore, a ring gear R2 (hereinafter "large ring gear") of the dual planetary gear 31 is directly restrained by a third brake B3 and is limited to rotation in one direction only by a second one-way clutch F2. The carrier CR1 is connected to a counter drive gear 33 which is supported by a casing partition to provide the output member of the first automatic transmission mechanism 26.

On the other hand, the second automatic transmission mechanism 27 is equipped with a single planetary gear 35 which has its carrier CR3 connected to a sun gear S3 through a third (direct) clutch C3. Moreover, the sun gear S3 is directly braked by a fourth (under drive) brake B4 and is limited to rotation in a single direction only by a third one-way clutch F3. A ring gear R3 is connected to a counter driven gear 36 which meshes with the aforementioned counter drive gear 33 to provide the input for the second transmission mechanism 27, and the carrier CR3 is connected to the counter shaft 22. Furthermore, this counter shaft 22 carries a reduction gear 37 providing the output member of the second automatic transmission mechanism 27.

The front differential unit 29 is equipped with a differential carrier 38 and right-hand and left-hand side gears 39a and 39b, and a ring gear 40 is fixed to a gear mounting casing acting as the differential carrier 38. The ring gear 40 meshes with the aforementioned reduction gear 37 to constitute a final reduction mechanism, and the right-hand and left-hand side gears 39a and 39b are connected, respectively, to the right-hand and left-hand axles 23a and 23b.

The operations of the present automatic transmission A will be described in the following with reference to FIG. 3.

The rotation of the engine crankshaft 21 is transmitted through the torque converter 25 or the lockup clutch 24 to the input shaft 1. At the 1st speed of the D range, the first clutch C1 is connected, and the fourth brake B4 is engaged. In the first automatic transmission mechanism 26 in this state, the rotation of the input shaft 1 is transmitted through the first clutch C1 to the small ring gear R1, but the large ring gear R2 is locked against rotation by the second one-way clutch F2. As a result, the shared carrier CRI is rotated forward at a drastically reduced speed while rotating the sun gear S1 idly backward, so that its rotation is extracted from the counter drive gear 33. In the second automatic transmission mechanism 27, the sun gear S3 is restrained by the fourth brake B4 and the third one-way clutch F3 so that the rotation from the counter driven gear 36 is transmitted as a reduced rotation from the ring gear R3 to the carrier CR3. As a result, the 1st speed rotation of the first automatic transmission mechanism 26 and the reduced rotation of the second automatic transmission mechanism 27 are combined, and this combined rotation is transmitted through the reduction gear 37 and the ring gear 40 to the front differential unit 29 and further to the right-hand and left-hand axles 23a and 23b.

In the 2nd speed state of the D range, the second brake B2 is applied in addition to the connection of the first clutch C1 and the application of the fourth brake B4. Then, the sun gear S1 has its rotation stopped by the application of the first one-way clutch F1 by action of the brake B2. As a result, the rotation of the small ring gear R1 by the input shaft 1 causes a reduced forward rotation of the carrier CR1 while rotating the large ring gear R2 idly forward, and the reduced rotation is extracted as the 2nd speed rotation to the counter drive gear 33. Moreover, the second automatic transmission mechanism 27 is left in the reduced state, and the combined rotation of the 2nd speed rotation of the first automatic transmission mechanism 26 and the reduced rotation of the second automatic transmission mechanism 27 is transmitted to the front axles 23a and 23b.

In the 3rd speed state of the D range, the first automatic transmission mechanism 26 keeps the 2nd speed state as it is, to release the fourth brake B4 and engage the third clutch C3 of the second automatic transmission mechanism 27. Then, the carrier CR3 and the sun gear 53 are united to rotate the planetary gear 35 integrally so that the directly connected rotation is extracted to the counter shaft 22. At this time, the fourth brake B4 is released prior to the engagement of the third clutch C3 while continuation of power transmission is provided for by the third one-way clutch F3. As a result, the 2nd speed rotation of the first automatic transmission mechanism 26 and the directly connected rotation of the second automatic transmission 27 are combined to establish a third speed for the whole automatic transmission A.

In downshifting to the 2nd and 3rd speeds in the D range, the first brake B1 is also applied to provide engine braking during coasting.

In the 4th speed state of the D range, the second clutch C2 is engaged. Then, the rotation is transmitted from the input shaft 1 through the first clutch C1 to the small ring gear R1 and through the second clutch C2 to the sun gear S1. As a result, the planetary gear unit 32 is integrally rotated so that the directly connected rotation is transmitted to the counter drive gear 33. The directly connected rotations of the first and second automatic transmission transmissions 26 and 27 are combined, and the counter drive gear 33 and the driven gear 36 are in a predetermined accelerating relation, so that an overdrive rotation is established for the automatic transmission A as a whole.

The 3rd range is established in the same mode as that of the 1st, 2nd and 3rd speeds of the D range if the first brake B1 is applied at the 2nd and 3rd speeds. The 2nd range is established in the same mode as that of the 1st and 2nd speeds of the 3rd range. Furthermore, in the 1st range the third brake B3 is applied in addition to the connection of the first clutch C1 and the application of the fourth brake B4 as in the 1st speed mode. In this state, the large ring gear R2 is restrained irrespective of the rotational direction not only by the second one-way clutch F2 but also by the third brake B3, thus establishing engine braking. Moreover, the 2nd speed state is established in the same mode as that of the 2nd speed in the 2nd range.

In the reverse range, on the other hand, the second clutch C2 is connected, and the third brake B3 and the fourth brake B4 are applied. In this state, the rotation of the input shaft 1 is transmitted through the second clutch C2 to the sun gear S1. In this state, the large ring gear R2 is fixed by the application of the third brake B3. As a result, the carrier CR1 is rotated backward together with the small ring gear R1 so that reverse rotation is obtained at the counter drive gear 33. Moreover, the reverse rotation of the counter drive gear 33 is reduced by the second automatic transmission mechanism 27 and transmitted to the front axles 23a and 23b.

Figure 1:
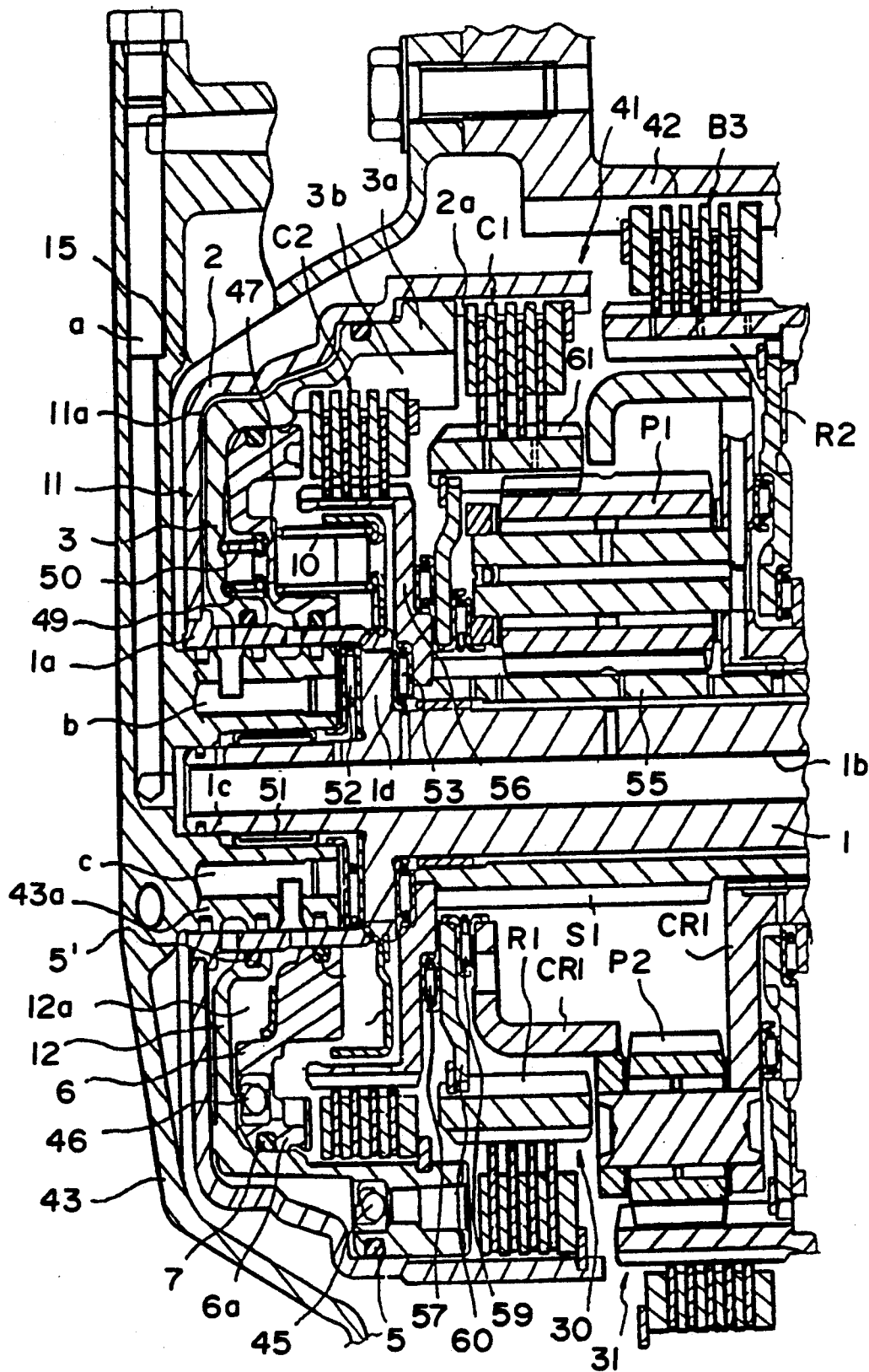
FIG. 1 is a partial cross-section showing a hydraulic actuator structure for use in an automatic transmission according to the present invention.

With reference to FIG. 1, the rear end clutch portion of the automatic transmission A forming an essential portion of the present invention will be described in the following.

The clutch portion, as designated at numeral 41, is equipped with the first (forward) clutch C1 and the second (reverse/ direct) clutch C2 and is positioned at the rear end of the first automatic transmission mechanism 26 and housed in the rear cover 43 of a transaxle casing 42. At the rear end portion of the input shaft 1, the cover 43 has a boss 43a surrounded by a mating sleeve 1a, which has its leading end connected to a drum member 2. This drum member 2 is in the form of a stepped cylinder having a closed bottom and has its inner circumference splined at its leading end, as at 2a, and forms an annular cylinder in cooperation with the outer circumference of the sleeve 1a. Moreover, this cylinder slidably receives first piston 3 fitted heremetically therein through O-rings 5 and 5'. The first piston 3 has a rim portion 3a aligned and engageable with a first clutch C1. As a result, the sleeve 1a, the back of the drum member 2 and the first piston 3 constitute a hydraulic actuator 11 with an oil chamber 11a for operating clutch C1. Moreover, the rim portion 3a has its outer circumference splined to engage with the spline 2a and houses a check valve 45 for releasing the centrifugal oil pressure. The first piston 3 also has its inner circumference splined, as at 3b, at its axially leading end and defines a second annular cylinder in combination with the sleeve 1a. This second annular cylinder receives a second piston 6 which is hermetically fitted therein through O-rings 7 and 7'. Second piston 6 which has a circumferential rim portion 6a aligned and engageable with the second clutch C2 and housing a check valve 46 for releasing the centrifugal oil pressure. As a result, the first piston 3 and the cylinder formed of the sleeve 1a and the second piston 6 constitute a second hydraulic actuator 12 having an oil chamber 12a for actuating second clutch C2. Moreover, the first clutch C1 actuating hydraulic actuator 11 and the second clutch C2 actuating hydraulic actuator 12 are radially superposed to constitute an integrated two-layered (double) hydraulic actuator unit 15. A retaining member 9 is fixed by a snap ring fitted on the sleeve 1a. A spring 10 is provided under compression between the piston 6 and retainer 9 and thus serves as a return spring for both of the two hydraulic actuators 11 and 12.

In the oil chamber 12a side of the second piston 6 are provided a number of annular spring receiving seats 47, and the portion of the first piston 3 axially opposite the receiving seats 47 is provided with a corresponding number of grooves 49. A corresponding number of compressed springs 50 are seated in and extend between those receiving seats 47 and grooves 49. The spring 50 has a predetermined weaker urging force than that of a return spring 10 and acts upon the second piston 6 against the urging force of the return spring 10. The spring 50 need not be a coil spring but may be another type of spring such as a dish spring.

The input shaft 1 has its rear end portion formed with a flange 1d and an end portion 1c having a reduced diameter such that the flange 1d supports one end of the sleeve 1a and the end portion 1c is supported by the rear cover box 43a through a needle bearing 51. Moreover, thrust bearings 52 and 53 are arranged at the right-hand and left-hand sides of the flange 1d to position the input shaft 1 axially, and a hollow shaft 55 formed with the sun gear S1 is rotatably supported on the outer circumference of the input shaft 1. The hollow shaft 55 is connected (although not shown) at its front end to the first and second brakes B1 and B2 and has its rear end portion fixed to a hub member 56. Between the spline formed on the outer circumference of the hub member 56 and the spline 3b formed on the inner circumference of the outer portion of the first piston 3, there is arranged the second clutch C2 which is composed of a number of clutch discs and plates. The small ring gear R1 of the single planetary gear 30 is loosely supported by a support plate 60 which is clamped between the hub member 56 and the carrier CR1 through thrust bearings 57 and 59. The small ring gear R1 has its outer circumference splined, as at 61. Between splines 61 and the splines 2a formed on the inner circumference of the outer portion of the drum member 2, there is arranged the first clutch C1 which is also formed of a number of clutch discs and plates.

The rear cover 43 is formed with a number of oil passages a, b and c leading from the valve body (hydraulic controller, not shown). The oil passage receives a lubricating oil under pressure, which is fed to a bore 1b formed at the center of the input shaft 1. Likewise, the oil passage b receives oil at a predetermined control pressure, which is fed through a communication hole to the oil pressure chamber 11a of the first clutch C1 actuating hydraulic actuator 11, and the oil passage c also receives oil at a predetermined control pressure, which is likewise led through a communication hole to the oil pressure chamber 12a of the second clutch C2 actuating hydraulic actuator 12.

The operations of the embodiment thus constructed will be described in the following with reference to FIG. 4.

Figure 4A:
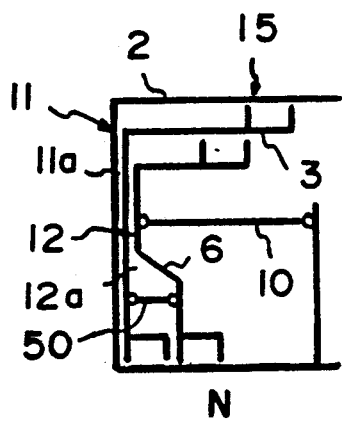
Figure 4B:
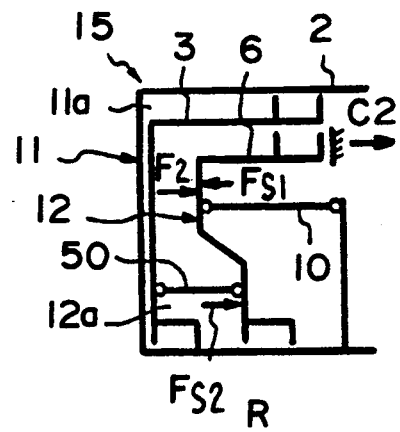

If the shift lever is moved from the neutral range N to the reverse range R (i.e., N→>R), the hydraulic actuator unit 15 is shifted from the neutral state, in which no control oil pressure is fed to the oil pressure chambers 11a and 12a, to the reverse state, as shown in FIG. 4(b). In other words, in the reverse state, a predetermined control oil pressure $Pc_2$ is fed through the oil passage c to the oil pressure chamber 12a of the second clutch C2 actuating hydraulic actuator 12 so that the second piston 6 is moved against the force of the return spring 10. At this time, a balance is established if the urging force $Fs_2$ of the spring 50 and the predetermined urging force $F_2$ of the second piston 6 are applied to the oil pressure chamber 12a of the piston 6 against the urging force $Fs_1$ acting upon the piston 6. In other words, the balance is expressed by the following Equation:

$$Fs_1 = F_2 + Fs_2.$$

This Equation may be rewritten in the following form:

$$F_2 = Fs_1 - Fs_2.$$

In short, the second piston 6 is in the state wherein the urging force $Fs_1$ of the return spring 10 is cancelled by the urging force $Fs_2$ of the spring 50 so that the oil pressure chamber 12c is fed with the predetermined control oil pressure $Pc_2$ to add a pushing force in accordance with the torque characteristics of the second clutch C2 to balance the piston pushing force $F_2$. Hence, this pushing force may be lower than that of the prior art by an amount equal to the urging force $Fs_2$ of the spring 50. As a result, the tendency of the control oil pressure $Pc_2$ to rise because of the relatively small pressure receiving area $A_2$ of the second piston 6 is decreased, so that the control oil pressure $Pc_2$ is lowered to a range allowing the accumulator to function normally by utilizing a properly chosen spring 50. Thus, at the shift of the N→>R ranges, the control oil pressure $Pc_2$ is boosted by operation of the accumulator so that the first clutch C2 may be smoothly engaged to prevent shift shock.

Figure 4C:
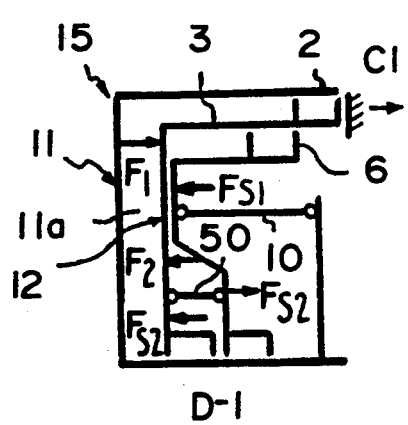

If, on the other hand, the shift lever is moved from the neutral range N to the drive range D (i.e., N→>D), the hydraulic actuator unit 15 is shifted from the neutral position, as shown in FIG. 4(a), to the 1st (to third) speed of the D range shown in FIG. 4(c). More specifically, in the D range state, a predetermined control oil pressure $Pc_1$ is fed from the oil passage b to the oil pressure chamber 11a of the first clutch C1 actuating hydraulic actuator 11 so that the first piston 3 is moved against the return spring 10. At this time, the rear of the first piston 3 receives the summed force of the pushing force $F_2$ acting upon the second oil pressure chamber 12a and the reaction force $Fs_2$ of the spring 50 and is balanced if the predetermined pushing force $F_1$ acts upon the first oil pressure chamber 11a against the summed force. This relation is expressed by the following Equation:

$$F_1 = F_2 + Fs_2.$$

Here, the pushing force $F_2$ acting upon the second oil pressure chamber 12a is expressed by $F_2 = Fs_1 - Fs_2$, as has been described hereinbefore. Hence:

$$F_1 = (Fs_1 - Fs_2) + Fs_2 = Fs_1.$$

In other words, the urging force of the return spring 10 acts, as in the prior art, upon the first clutch C1 actuating hydraulic actuator 11. As a result, even if the shift lever is moved from the D range in a high speed state to the N range, a high centrifugal force is exerted upon the O-ring 5 which assumes an expanded diameter state because of the high speed. Even if, therefore, high sliding resistance is applied to the O-ring 5, the piston 3 is moved by the aforementioned relatively strong return spring 10, and the oil pressure in the oil pressure chamber 11a is quickly drained so that the transmission is returned to the N range with no trailing torque. In the shift of the N→>D ranges, moreover, the first piston 3 receives a pushing force, corresponding to the torque characteristics of the first clutch C1, against the urging force $Fs_1$ of the relatively strong return spring 10. To meet this requirement, the first piston 3 has a relatively large pressure receiving area $A_1$ so that the control oil pressure $Pc_1$ is sufficient even at a low level, despite the aforementioned relatively high piston pushing force. As a result, the control oil pressure $Pc_1$ allows normal function of the accumulator thereby boosting the pressure so that the first clutch C1 is brought into smooth engagement. Thus, the N→>D shift is effected without any high shift shock.

Figure 4D:
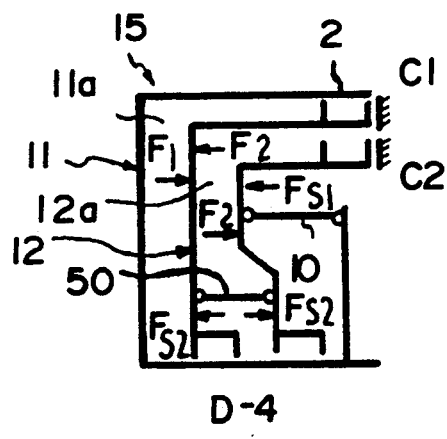

For a shift from the 3rd to the 4th speeds in the D range, the hydraulic actuator unit 15 is shifted from the 3rd speed state of the D range, as shown in FIG. 4(c), to the 4th speed of the D range, as shown in FIG. 4(d). Specifically, with the oil pressure chamber 11a of the first clutch C1 actuating hydraulic actuator 11 receiving oil pressure so that the first piston 3 is moved through the predetermined stroke $s_1$, the oil pressure chamber 12a of the second clutch C2 actuating hydraulic actuator 12 receives the predetermined control oil pressure $Pc_2$ so that the second piston 6 is moved against the return spring 10. At this time, the piston pushing force $F_1$ acting upon the first piston 3 is the urging force $Fs_1$ of the return spring 10, as expressed before by the following Equation:

$$F_1 = F_2 + F_{s2} = F_{s1}.$$

On the other hand, the pushing force $F_2$ acting upon the second piston 6 is the difference obtained by subtracting the urging force $F_{s2}$ of the spring 50 from the urging force $F_{s1}$ of the return spring 10, as expressed by the following Equation:

$$F_2 = F_{s1} - F_{s2}.$$

Hence, the control oil pressure $Pc_2$ acting upon the second piston 6 may be lower than in the prior art, although the pressure receiving area $A_2$ of the second piston 6 is relatively small. Thus, the control pressure $Pc_2$ can allow the accumulator to function normally to boost the pressure so that the shift of the 3rd to 4th speeds can be achieved without any high shift shock by smoothly engaging the second clutch C2. In FIG. 5, the ordinate indicates the piston pushing force F, and the abscissa indicates the piston stroke (s). In FIG. 5, in the shift of N→>D ranges, the pushing force F1 which acts upon the first piston 3 increases as the return spring 10 increases its urging force from the initial value $F_{s2}(0)$ in proportion to the piston stroke $(0→S_1)$. In the shift of N→>R ranges, on the other hand, the pushing force $F_2$ which acts upon the second piston 6 increases relatively steeply from the starting point, at which the initial urging force $F_{s2}(0)$ of the spring 50 is subtracted from the initial urging force $F_{s1}(0)$ of the return spring 10, because the urging force $F_{s1}$ of the return spring 10 increases in proportion to the piston stroke $(0→>S_2)$ and the urging force $F_{s2}$ of the spring 50 decreases in proportion to the piston stroke $(0→>S_2)$. In shifting from the 3rd to 4th speeds in the D range, the piston stroke $(S_1→>S_1+S_2)$ further increases, but the pushing force $F_1$ which acts upon the first piston 3 increases in direct proportion to the increase in the urging force of the return spring 10, in accordance with the increase in stroke. Moreover, the pushing force $F_2$ which acts upon the second piston 6 increases relatively steeply like before from the starting point, at which the initial urging force $F_{s2}(O)$ of the spring 50 is subtracted from the pushing force $F_1(O)$ of the first piston 3 at the 1st to 3rd speeds of the D range. Hence, the initial return force x of the second piston 6, as expressed by the following equation, is set to a proper value corresponding to the sliding resistance of the O-rings 7 and 7' of the second piston 6 by properly selecting the initial tension $F_{s2}(O)$ of the spring 50:

$$x = F_{s1}(0) - F_{s2}(0).$$

In the embodiments thus far described, the hydraulic actuator unit 15 actuates the forward clutch C1 to be engaged in forward running, and the reverse/direct clutch C2 to be engaged in reverse and in forward 4th speed running. Despite this fact, however, the present invention is not limited to the foregoing embodiments but can likewise be applied to a structure using another type of double piston (two-layered) hydraulic actuator.

As has been described hereinbefore, according to the present invention, the second spring acts upon the second piston in a direction against the urging force of the return spring. As a result, it is sufficient to feed a lower control oil pressure than that of the prior art to the second frictional engagement element hydraulic actuator which necessarily has the lower of the pressure receiving areas of the two pistons because of the two-layered hydraulic actuator structure. Especially at the start of piston movement, the oil pressure can be set at a lower level to enable the hydraulic actuator to function properly thereby to lighten the shift shocks. At the same time, the first frictional engagement element hydraulic actuator, which necessarily has the larger pressure receiving area, can receive the entire urging force of the return spring so that the piston can be quickly returned irrespective of the sliding resistance due to the O-rings and so on to thereby prevent trailing torque.

By properly selecting the urging forces of the two springs the returning forces of the first piston and the second piston can be set independently of each other to increase their degree of freedom drastically and allow individual setting of the control oil pressures for the first and second frictional engagement element hydraulic actuators. Thus, the accumulators and the like can be designed to easily set the optimum hydraulic characteristics of the individual control oil pressures.

Especially if the first frictional engagement element is a forward clutch to be engaged for forward running whereas the second frictional engagement element is a reverse/direct clutch to be engaged for the reverse running and for direct connection, the shocks at the shifts from the neutral range N to the reverse range R and from the 3rd to 4th speeds can be drastically reduced, and the shift from the neutral range N to the drive range D can be quickly completed without any trailing torque even during high speed running.

We claim:

1. A double piston hydraulic actuator for an automatic transmission comprising:
   a first hydraulic actuator including:
     an inner cylinder;
     a first outer cylinder;
     a first wall connecting the inner cylinder and the first outer cylinder; and
     a first piston slidably mounted between the inner and first outer cylinders for axial movement to engage or disengage a first friction member, said first piston defining a first oil chamber in cooperation with the inner and first outer cylinders and the first wall; and
   a second hydraulic actuator including:
     a second outer cylinder and second wall defined by the interior of said first piston;
     a second piston slidably mounted between the inner and second outer cylinders for axial movement to engage or disengage a second friction member, said second piston defining a second oil chamber in cooperation with said inner and second outer cylinders and said second wall;
     a retainer supported by said inner cylinder;
     biasing means provided between said retainer and the second piston for biasing the first and second pistons against hydraulic pressure in the first and second oil chambers, and
     spring means, provided between the first and second pistons, for biasing said second piston away from said first piston in opposition to said biasing means.

2. A double piston hydraulic actuator for an automatic transmission according to claim 1, wherein said spring has a predetermined weaker urging force than said biasing means.

3. A double piston hydraulic actuator for an automatic transmission according to claim 1, wherein said first and second friction members may be engaged either individually or simultaneously.

4. A double piston hydraulic actuator for an automatic transmission according to claim 1 wherein said biasing means is a set.

5. An automatic transmission with an input means, an output means and a planetary gear set connected between the input means and the output means, said automatic transmission comprising:
    a first clutch for being engaged in forward drive and disengaged in reverse drive;
    a second clutch for being engaged in reverse drive and direct forward rotation;
    a double piston hydraulic actuator having first and second sections, said first hydraulic actuator section including:
        an inner cylinder;
        a first outer cylinder;
        a first wall connecting the inner cylinder and the first outer cylinder; and
        a first piston slidably mounted between the inner and first outer cylinders for axial movement to engage or disengage a first friction member, said first piston defining a first oil chamber in cooperation with the inner and first outer cylinders and the first wall; and
    said second hydraulic actuator section including:
        a second outer cylinder and a second wall defined by the interior of said first piston;
        a second piston slidably mounted between the inner and second outer cylinders for axial movement to engage or disengage a second friction member, said second piston defining a second oil chamber in cooperation with the inner and second outer cylinders and the second wall;
        a retainer supported by said inner cylinder;
        biasing means provided between said retainer and the second piston for biasing the first and second pistons against hydraulic pressure in the first and second oil chambers, and
        a spring, provided between the first and second pistons, for biasing said second piston away from said first piston in opposition to 6. An automatic transmission according to claim 5, wherein said spring has a predetermined weaker urging force than said biasing means.

7. An automatic transmission according to claim 5, wherein said first and second clutches may be engaged either individually or simultaneously.

8. A hydraulic actuator for an automatic transmission according to claim 5 wherein said biasing means is a set.

9. An automatic transmission according to claim 5, wherein said planetary gear set comprises:
    a single planetary gear set including:
        a first sun gear connected to the input means through the second clutch;
        a first carrier; and
        a first ring gear connected to the input means
    through the first clutch; and a dual planetary gear set including:
        a second sun gear connected to the first sun gear and a first brake;
        a second carrier connected to the first carrier and the output means and
        a second ring gear connecting said second carrier to a second brake through a pinion gear.

10. An automatic transmission according to claim 9 further comprising:
    an one-way brake connected to the second ring gear; and
    a third brake connected to the second sun gear through an one-way clutch.

11. An automatic transmission according to claim 9 wherein said first sun gear and said second sun gear are integrally formed as a single gear and wherein said first and second carriers are integrally formed as a single carrier.

* * * * *

UNITED STATES PATENT AND TRADEMARK OFFICE
CERTIFICATE OF CORRECTION

PATENT NO. : 5,232,418
DATED : August 3, 1993
INVENTOR(S) : AOKI et al

It is certified that error appears in the above-indentified patent and that said Letters Patent is hereby corrected as shown below:

Col. 1, line 66, "S," should read --$S_2$--.

Col. 2, line 11, "A," should read --$A_2$--.

Col. 4, line 44, "CRI" should read --CR1--.

Col. 5, line 12, "53" should read --$S_3$--.

Col. 12, line 5, after "opposition to" insert --said biasing means--;

line 26, after "means" insert a semicolon ";".

Signed and Sealed this

Twenty-sixth Day of July, 1994

Attest:

BRUCE LEHMAN

Attesting Officer     Commissioner of Patents and Trademarks